Aug. 26, 1952   A. P. PAYAMPS   2,607,990
UNIVERSAL INDICATOR

Filed May 15, 1951   2 SHEETS—SHEET 1

INVENTOR.
Augustin P. Payamps
BY
W. W. Williamson
ATTORNEY

Aug. 26, 1952     A. P. PAYAMPS     2,607,990
UNIVERSAL INDICATOR
Filed May 15, 1951     2 SHEETS—SHEET 2
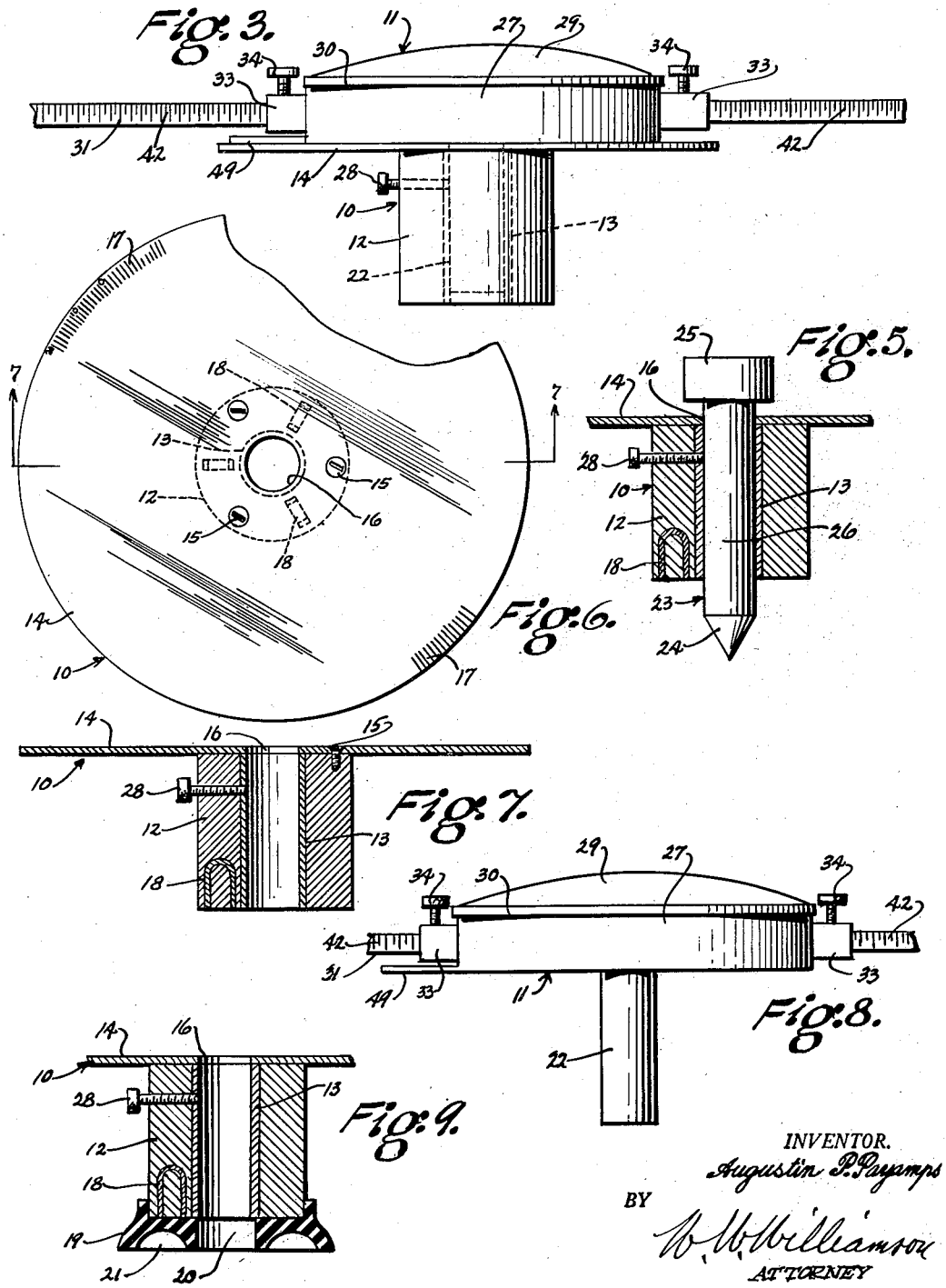
INVENTOR.
Augustin P. Payamps
BY
W. W. Williamson
ATTORNEY Patented Aug. 26, 1952

2,607,990

UNITED STATES PATENT OFFICE 2,607,990

UNIVERSAL INDICATOR

Augustin P. Payamps, Philadelphia, Pa.

Application May 15, 1951, Serial No. 226,489

4 Claims. (Cl. 33—27)

My invention relates to a new and useful universal indicator to be employed, particularly, although not limited, for measuring distances on templates, pieces of work and the like obtained from blue prints, drawings or other sources of information and for checking layout work. The instrument is also useful in scribing circles or arcs thereof.

Another object of this invention is to produce an instrument of the type herein mentioned capable of obtaining measurements in inches and fractions thereof as well as in degrees and minutes.

Another object of the invention is to produce an indicating measuring instrument including a casing, provided with certain measurement indicating elements, and a measuring-rod projectable completely through said casing along a diameter thereof whereby exceedingly small as well as maximum measurements may be obtained. Both ends of said measuring-rod may be utilized thereby enabling a mechanic to procure measurements or lay out parts of a work job on either or both sides of an obstruction, such as the spindle of a machine in which a work-piece is mounted.

Another object of this invention is to construct the instrument in such a manner that parts thereof constitute a vernier.

A further object of the invention is to provide built-in magnetic means as a part of the instrument post to temporarily attach said instrument to a metallic template or work-piece having inherent magnetic attractive qualities.

A still further object of the present invention is to provide an attachable vacuum cup for use as a substitute for the magnetic means to temporarily attach the instrument to any type of template or work-piece having a relatively smooth surface.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawings forming a part hereof, in which:

Fig. 3 is a further enlarged side view of the same.

Fig. 5 is a fragmentary vertical sectional view of the base member, including the post and dial plate, with the center finding pin therein.

Fig. 6 is top face view of the base member with a portion of the dial plate broken away.

Fig. 7 is a section on the line 7—7 of Fig. 6.

Fig. 8 is a side view of the head member of the instrument with the ends of the measuring-rod broken away.

Fig. 9 is a fragmentary vertical sectional view of the base member with the vacuum cup holder on the lower end of the post.

In carrying out the invention as herein embodied 10 and 11 represent, respectively, the base and head members.

Figure 1:
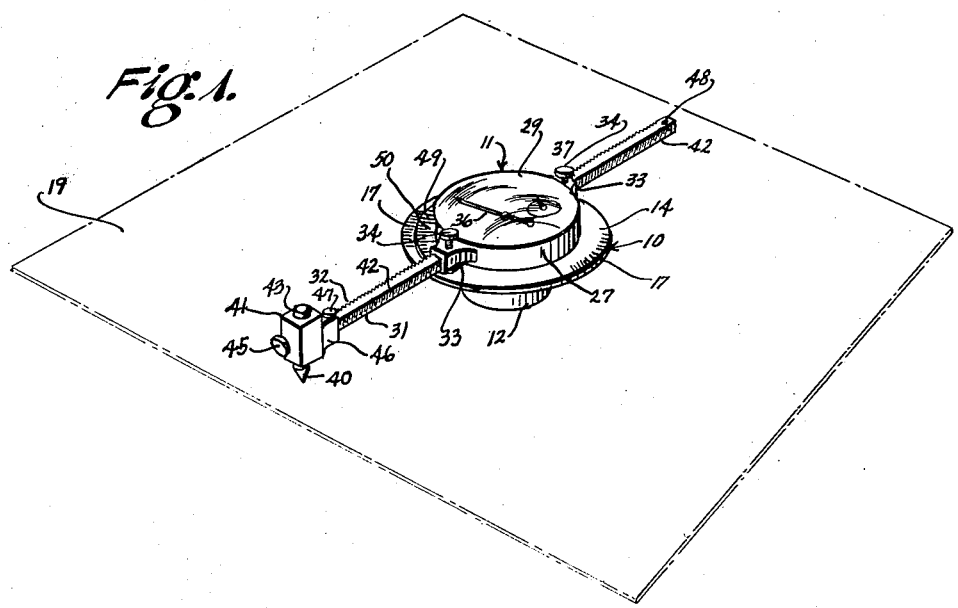
Fig. 1 is a perspective view of a universal indicating instrument shown mounted on a surface represented as a material sheet in dot and dash lines.
Figure 2:
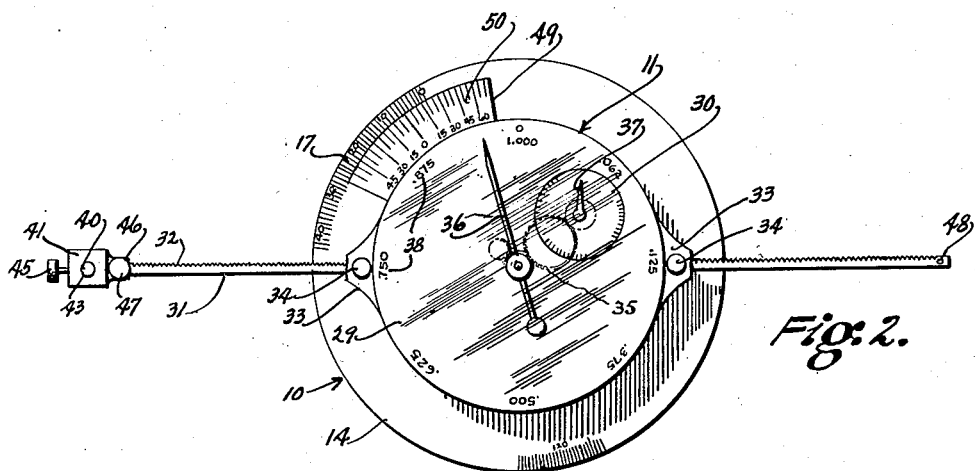
Fig. 2 is a slightly enlarged top plan view of the instrument.
Figure 4:
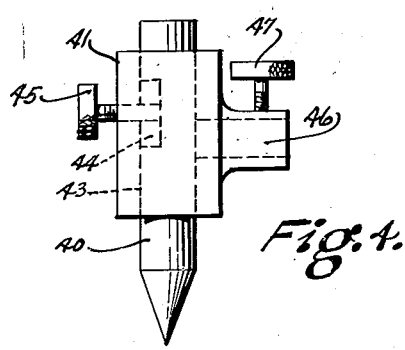
Fig. 4 is a side view of the holder for a marking item, such as a scriber.

The base member includes a tubular post 12 of lead with a bushing 13 of hard metal, such as brass, in the bore of said post and a dial plate 14 secured to the upper end of said post by suitable fastening means 15, such as screws. The dial plate 14 is in the form of a disc with a central hole 16 of the same diameter as the inside diameter of the bushing 13 and has graduation marks 17 on the top face for the entire 360 degrees contiguous the perimeter. In the body portion of the lead post 12, at the extreme bottom end thereof, are embedded permanent magnets 18, preferably of the horseshoe type to temporarily attach the instrument to the surface of a metal article 19, Fig. 1, such as a template or work-piece, having qualities which will attract the magnets.

Where the instrument is used with other metals, wood, plastics and the like, a suction cup 19, Fig. 9, is slipped on the bottom end of the post 12 to function as the temporary attaching means for the instrument. This suction or vacuum cup 19 has a central hole 20 for alignment with the post bore, particularly the bore of the bushing 13, but slightly larger than the latter to allow inward expansion of the vacuum cup without interfering with the passage through the post or bushing bores. The chamber position of said cup is a circular channel 21 concentric with the hole 20.

The base member 10 is to receive the stem 22 of the head member 11 or a center finder pin 23 either of which fits snugly into the post or bushing bores. As shown in Fig. 5, the center finder pin 23 has pointed bottom end 24 and a head 25 and the body portion 26 of said pin is longer than the post whereby the pointed end projects beyond or below the bottom of said post for registration with an indentation, such as made by a center punch, in the surface of a template or work-piece and so that said pointed end may be viewed below the post during the center finding operations.

The head member 11, in addition to the stem 22, includes a casing 27 revolvably mounted on the upper end of said stem which is held stationary in the post of the base member by a set screw 28 threaded radially through one side of the post to enter the bore thereof or, more particularly, the bore of the bushing. The normally open top of the casing is covered by a transparent face 29 held in place by a bezel ring 30, Figs. 3 and 8.

A measuring-rod 31 has teeth 32 on one side to form a rack and projects diametrically through and through the casing with both ends of said rod normally protruding from opposite sides of said casing. At the locations of passage of the measuring-rod through the casing walls, the latter may be strengthened by lugs or projections 33 and set screws 34 threaded therein to impinge upon a surface of said rod to retain it in various positions.

The measuring-bar rack meshes with one of a train of gears 35 connected with the main pointer 36 and the secondary pointer 37 and said gears are so proportioned and timed that said secondary pointer makes forty revolutions to every one revolution of the main pointer 36. Indication marks 38, representing divisions of one inch, are provided under the face 29 and associated with the main pointer, one complete revolution of which represents a one inch longitudinal movement of the measuring-rod 31. Likewise indication marks 39, representing smaller sub-divisions of an inch, such as thousandths of an inch, are also provided under the face 29 and associated with the secondary pointer 37, one complete revolution of which represents twenty-five thousandths of an inch of movement of the measuring-rod 31.

Proper compensation is allowed for the distances between the axial center of the instrument and the outer ends of the lugs or projections 33 and the location of the scriber 40 on either end of the measuring-rod 31 where said scriber is removably mounted by holder 41. This will permit reading of the indication marks 42 on the measuring-rod, when and if desired, with the outer ends of the lugs or projections 33 as the starting locations.

The scriber holder 41 has a bore 43 to receive the scriber 40 having a pointed lower end, a flat upper end and a cut-out notch 44 into which projects a set screw 45 threaded into the holder for retaining said scriber in various longitudinally adjusted positions and preventing the scriber from becoming accidentally displaced when the set screw 45 is merely backed off sufficiently to adjust said scriber. At one side of the holder is a socketed lateral projection 46 to receive either end of the measuring-rod into which is threaded a set screw 47 for projection into a hole 48, one at each end of said measuring-rod, to fasten the scriber holder in proper location to coincide with the measurement indication marks.

From the exterior of the casing projects the vernier segment 49 having indication marks 50, each one thousandth of an inch apart, cooperating with the indication marks 17, representing degrees, for designating the sweep movements of the measuring-rod in degrees and minutes as the head member or casing 27 and component parts are rotated relative to the base member 10 or the dial plate 14 in particular.

In operation, the head member 11 is first detached from the base member 10 and the center finder pin 23 is placed in said base member as suggested in Fig. 5. The pointed end of the pin is then placed on a desired or predetermined center and the base member slid along said pin until the magnet or vacuum cup bearing end of the post engages the surface of a template or work-piece at which time the base member 10 will be securely held in place. The center finding pin is then withdrawn and the head member 11 assembled on the base member by inserting the stem 22 in the bore of the post or, more particularly, in the bushing and temporarily fastening the two members together by the set screw 28.

With the instrument thus set any point within the radius of the measuring-bar 31 can be determined or laid out according to plans embodied in drawings, blue-prints or the like by manually operating said measuring-bar longitudinally until the scriber 40 reaches the desired location and noting the number of revolutions or partial revolutions of the pointers 36 and 37 with relation to their associated indication marks. Likewise, the angular relation of two points relative to each other may be determined or laid out by placing the scriber at one point and then rotating the casing until said scriber reaches the other point while noting the movements or position of the vernier segment relative to the indication marks on the dial plate 14 which will give the degrees or the degrees and minutes of space between the points.

By way of example, if it is desired to lay out an arc of thirty degrees and fifty minutes having a radius of two and ten thousandths inches, the instrument is first set on a predetermined center as described above and the measuring-rod moved longitudinally until the main pointer 36 makes two complete revolutions plus a partial revolution equal to ten-thousandths represented by the proper indication marks associated with the secondary pointer 37. Then the head member 11 is rotated on the base member 10 until the zero indication mark on the vernier segment passes the thirty degree mark of the indication marks 17 on the dial plate and until the proper one of the indication marks 50 coincides with the proper one of the indication marks 17 to represent fifty minutes. During the rotation of the head member the scriber is pressed down so the scriber will mark the surface over which it is passed.

From the foregoing it will be apparent that I have produced an exceedingly simple, compact and novel structure for determining measurements and laying out work according to scale within very small dimensions up to and including the full extent of the reach of the measuring-bar.

Of course I do not wish to be limited to the exact details of construction herein shown and described as these may be varied within the scope of the appended claims without departing from the spirit of my invention.

Having described my invention what I claim as new and useful is:

1. A universal indicator comprising a tubular post of non-magnetic material having permanent magnetic means embedded therein and exposed at the lower end thereof and a dial plate on the upper end of said post, two elements interchangeably mounted in said post, one of said elements constituting a center finder pin having a pointed end projectable below the lower end of said post, said other element including a stem entering the post, a casing rotatably mounted on said stem, a rack toothed measuring-rod projecting all the way through opposite sides of said casing and slidably mounted along a diameter of said casing, a main pointer and a secondary pointer mounted in the casing, a gear train meshing with teeth of the measuring-bar and connected with the pointers to cause the main pointer to make one complete revolution for a one inch longitudinal movement of the measuring-rod and simultaneously cause the secondary pointer to make one complete revolution for each twenty-five thousandths of an inch movement of said measuring-bar, said casing having sets of indication marks thereon, one set representing the larger graduations of one inch and associated with the main pointer and the other set representing thousandths of an inch and associated with the secondary pointer, a vernier segment projecting from said casing and having indication marks thereon for cooperation with indication marks on the dial plate and representative of degrees, and a scriber holder detachably mounted on either end of the measuring-rod.

2. The universal indicator according to claim 1, in combination with a vacuum cup detachably mounted on the lower end of the post and having a hole therethrough aligned with the bore of said post.

3. In an instrument of the class described, the combination of a base member, and a head member detachably connected to each other, said base member including a lead post having a central bore, a bushing of hard metal mounted in said bore, permanent magnets embedded in said post at the outer end thereof, a set screw projected through a side of the post into the bore thereof, a graduated dial plate of disc formation and having a hole aligned with the post bore, said head member including a casing of smaller diameter than the dial plate, and a stem, said stem assembled in the post bore of the base member to rotatably mount the casing on the base member and temporarily retained in place by the set screw after a setting is obtained, a vernier segment projecting from a side of the casing and imposed on and terminating short of the perimeter of the dial plate and having graduations thereon cooperating with the graduations on said dial plate to determine the angular degrees and minutes of rotation of the casing from a predetermined location, a rack toothed measuring-rod slidably mounted and projecting completely through the casing along a diameter thereof, pointers actuated by the longitudinal movements of said measuring-rod and associated with indication marks to represent dissimilar graduations of linear movement of said measuring-rod, and a scriber holder removably mounted on an end of the measuring-rod.

4. A universal indicator comprising a tubular post of non-magnetic material having permanent magnetic means embedded therein and exposed at the lower end thereof and a dial plate on the upper end of said post, a casing, a stem carried by said casing and rotatably mounted in the tubular post, a rack toothed measuring rod projecting all the way through opposite sides of said casing and slidably mounted along a diameter of said casing, apertured strengthening lugs at the locations of the passage of the measuring rod through the sides of said casing, set screws threaded into said lugs and impinging on said measuring rod, a main pointer and a secondary pointer mounted in the casing, a gear train meshing with the teeth of the measuring rod and connected with the pointers to cause the main pointer to make one complete revolution for a one inch longitudinal movement of the measuring rod and simultaneously cause the secondary pointer to make one complete revolution for each twenty-five thousandths of an inch movement of said measuring rod, said casing having sets of indication marks thereon, one set representing the larger graduations of one inch and associated with the main pointer and the other set of indication marks representing thousandths of an inch and associated with the secondary pointer, a vernier segment projecting from said casing and having indication marks thereon for cooperation with indication marks on the dial plate and representative of degrees, and a scriber holder detachably mounted on either end of the measuring rod.

AUGUSTIN P. PAYAMPS.

REFERENCES CITED

The following references are of record in the file of this patent:

UNITED STATES PATENTS

| Number | Name | Date |
|---|---|---|
| 135,249 | Shumard | Jan. 28, 1873 |
| 677,339 | Comstock | July 2, 1901 |
| 710,257 | De Leeuw | Sept. 30, 1902 |
| 1,617,485 | Hughes | Feb. 15, 1927 |
| 1,778,481 | Boucher | Oct. 14, 1930 |
| 2,424,286 | Robbins | July 22, 1947 |
| 2,568,524 | Verderber | Sept. 18, 1951 |

FOREIGN PATENTS

| Number | Country | Date |
|---|---|---|
| 546,190 | Great Britain | July 1, 1942 |